United States Patent [19]

Maron

[11] Patent Number: 5,067,807
[45] Date of Patent: Nov. 26, 1991

[54] REMOVABLE FILM BOXES FOR A CAMERA

[76] Inventor: Stanislav Maron, 7801 N. 54th St., Paradise Valley, Ariz. 85253

[21] Appl. No.: 525,460

[22] Filed: May 18, 1990

Related U.S. Application Data

[62] Division of Ser. No. 260,450, Oct. 20, 1988.

[51] Int. Cl.$^5$ .............................................. G03B 23/02
[52] U.S. Cl. ................... 352/78 R; 352/72; 352/75; 352/76; 352/156
[58] Field of Search .................. 352/72, 75, 76, 78 R, 352/156

[56] References Cited

U.S. PATENT DOCUMENTS

| | | | |
|---|---|---|---|
| 1,215,534 | 2/1917 | Howell | 352/76 |
| 1,944,031 | 1/1934 | Laug . | |
| 2,506,649 | 5/1950 | Reeves . | |
| 2,733,633 | 2/1956 | Wottring . | |
| 3,303,981 | 2/1967 | Wiese . | |
| 3,428,395 | 2/1966 | Mitchell | 352/194 |
| 3,625,406 | 12/1971 | Campbell | 226/52 |
| 3,776,626 | 12/1973 | Lewis | 352/194 |
| 3,914,035 | 10/1975 | Satterfield | 352/191 |
| 3,997,251 | 12/1976 | Mitchell | 352/72 |
| 4,331,396 | 5/1982 | Nyman | 352/85 |
| 4,360,254 | 11/1982 | Nyman et al. | 352/166 |
| 4,410,254 | 10/1983 | Niemuth et al. | 354/203 |
| 4,522,476 | 6/1985 | Renold . | |
| 4,534,630 | 8/1985 | Williamson | 352/194 |
| 4,726,674 | 2/1988 | Smith et al. | 354/203 |
| 4,835,555 | 5/1989 | Maxwell | 352/194 |

OTHER PUBLICATIONS

Article entitled, "Current Information Summary" in "Product Application (CIS-80)", May 25, 1985, Kodak.

Primary Examiner—Monroe H. Hayes
Attorney, Agent, or Firm—Cahill, Sutton & Thomas

[57] ABSTRACT

Film boxes for attachment to and use with a camera are keyed and secured by thumb screws to a shutter housing of the camera to permit detachment and accurte reattachment. Light restrictive devices negate transmission of light into each film box upon removal of same. A longitudinally displaceable film reel drive permits rapid disengagement and reengagment of the film boxes without careful alignment and a belt drive prevents, through slippage, film tearing forces.

7 Claims, 6 Drawing Sheets

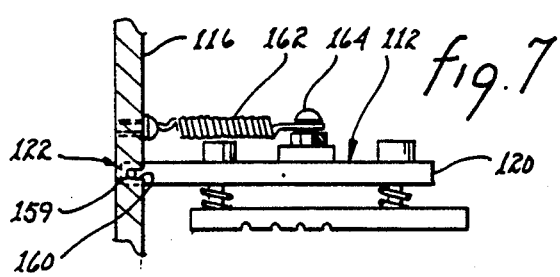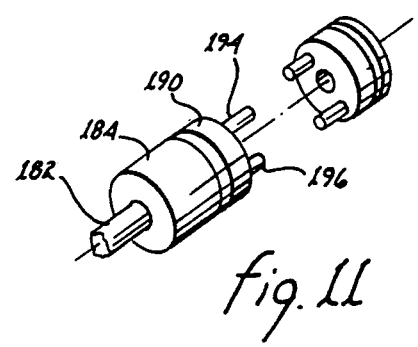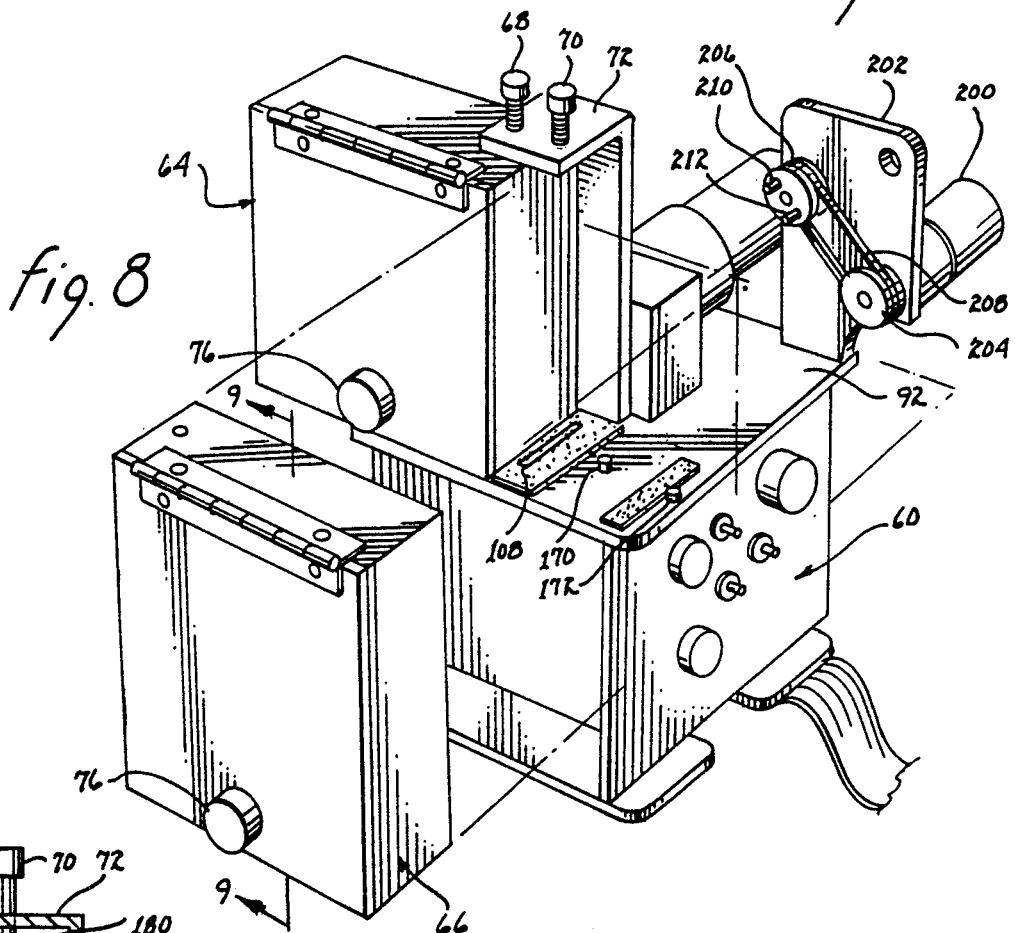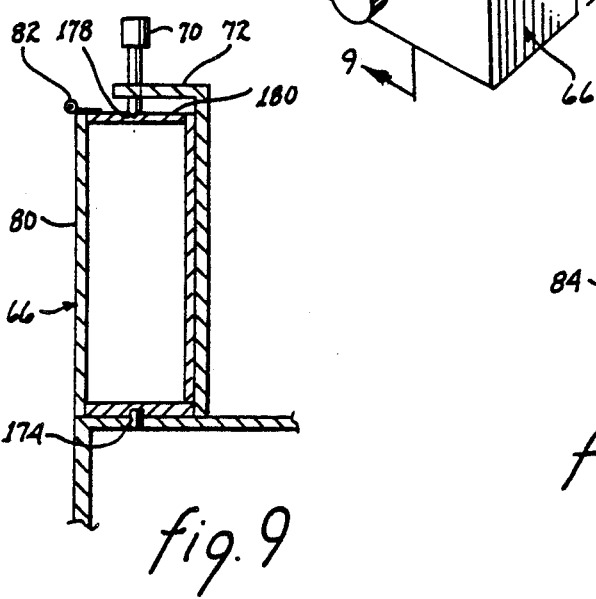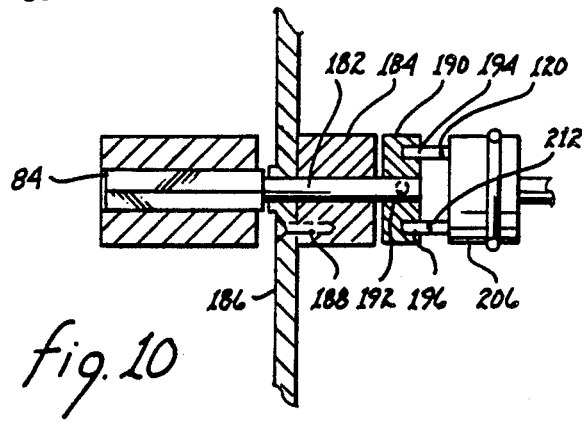

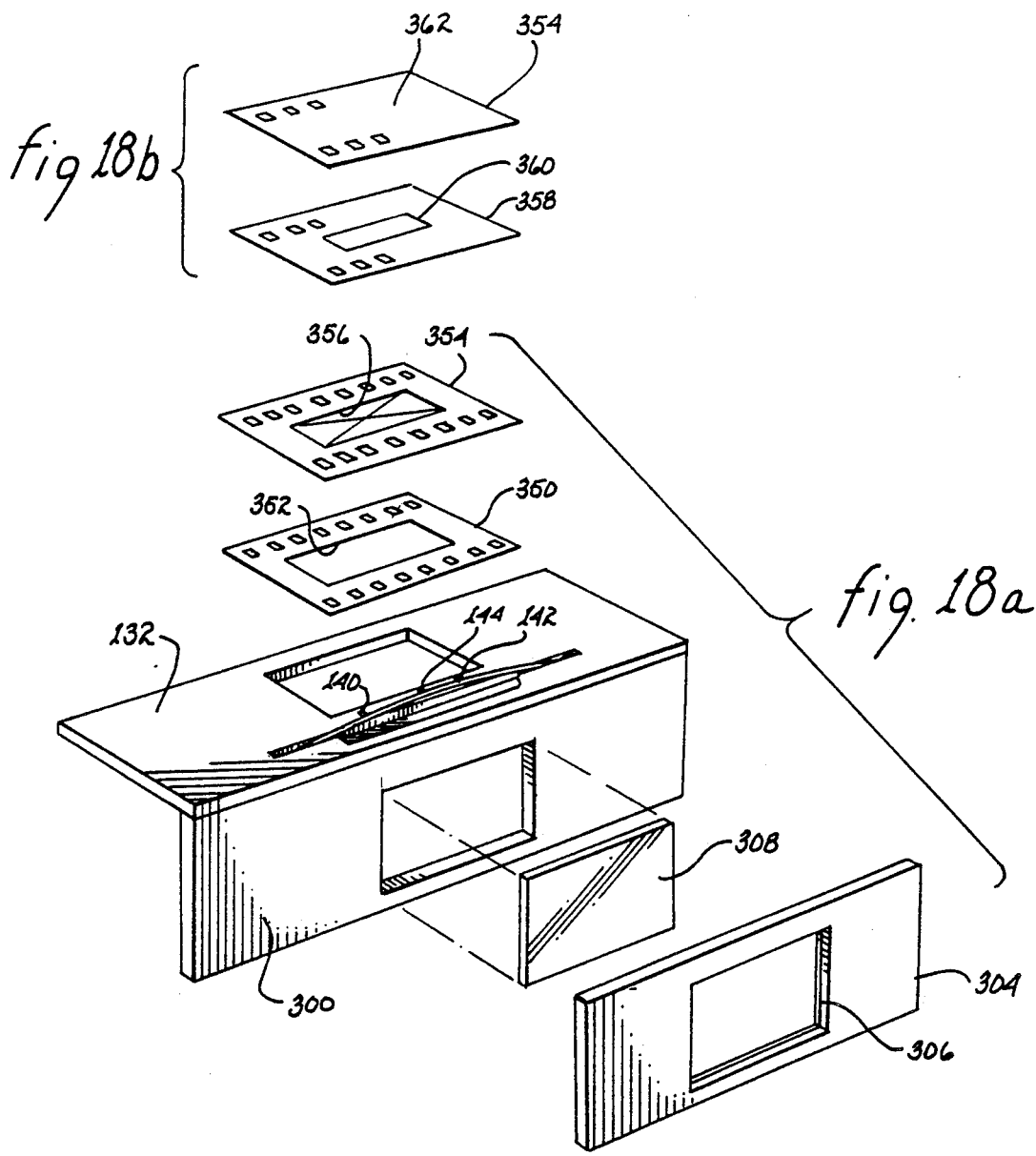
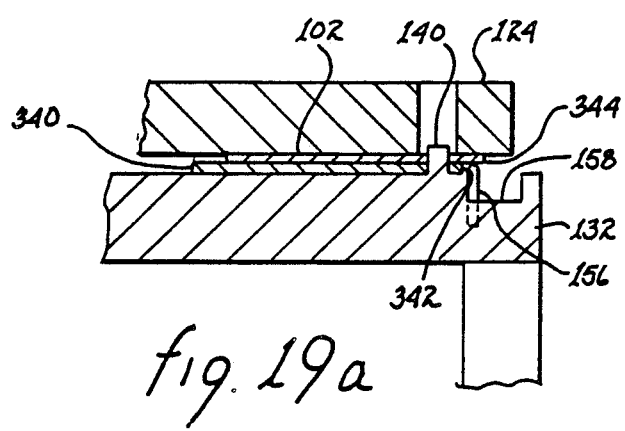
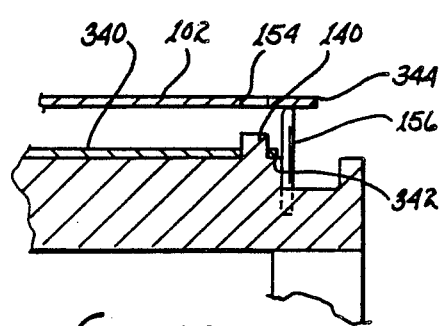

REMOVABLE FILM BOXES FOR A CAMERA

BACKGROUND OF THE INVENTION

1. Field of the Invention

The present invention relates to film transport mechanisms and, more particularly, to removably film boxes with disengageable drives, film registration devices and semicircular shutters.

2. Description of the Prior Art

Film boxes for cameras used particularly in making multiple exposure images generally include a pair of film boxes to house the unexposed and exposed film. These film boxes are generally not removable and remountable without meticulous attention to alignment of the drive mechanisms; often, threading the film from the film boxes into the camera is a difficult, time consuming and laborious process with danger of inadvertently exposing the film. A shutter for multi exposure images generally includes a rotatably driven segmented disk having multiple journals for support. The structure attendant the shutter requires a substantial disk diameter, which diameter is an impediment to the minimum size of the camera casing or housing; moreover, the support and drive apparatus for the disk may often be the dictating criteria for the camera housing size.

Registration of a film strip for obtaining a multi exposure image generally includes a pair of registration pins cooperating with the sprocket holes in the film strip. Such pair of pins do not accommodate for various common problems, such as film elongation. Moreover, the registration pins are associated with the structure for holding the film in place and impede or otherwise render difficult insertion and/or removal of a film strip, advancement of a film strip and other film strip transport requirements. In some prior art configurations, difficulties exist with regard to mounting and demounting masks and other elements to be superimposed with an image on a film strip.

SUMMARY OF THE INVENTION

A removable film box, whether used for unexposed or exposed film, is aligned with a camera by keying members for positioning accuracy and a simple thumb screw for retention, which minimize, cooperatively, the effort and difficulty in mounting or demounting the film box. A pair of opposed axially aligned pairs of studs extending from opposed rotatable mountings serve as a transmission intermediate the film reel shaft extending from a film box and a power source to permit rapid engagement and disengagement of the transmission upon mounting and demounting of the film box. A pair of pins accurately dimensioned in the longitudinal axis only and a pin accurately dimensional in the lateral axis only cooperate with a film strip and any masks or images to be superimposed upon the film strip to obtain accurate repeatable positioning in both the longitudinal and lateral axes. A single bushing journals a shaft having a disk shutter secured to one end and a driven gear secured to the other end. A flat on the bushing is attached to a wall in proximity to the near edge of the film strip to minimize the diameter of the shutter disk. Flats are incorporated in a disk supporting boss to obtain timing signals for actuating operative elements of the camera and for synchronizing the various coacting interdependent mechanisms of the camera.

A primary object of the present invention is to provide a reduced size camera having highly accurate film registration devices, a shutter of minimum weight and moment of inertia and a pair of readily removable film boxes.

Another object of the present invention is to provide a two axes film registration which automatically disengages a film strip upon release of a film pressure plate.

Still another object of the present invention is to provide two axes registration pins for superimposing masks and the like with a film strip to permit accurately aligned multi exposure images.

Yet another object of the present invention is to provide structure for accommodating a reduced size disk shutter.

A further object of the present invention is to provide a readily disengageable and reengagable transmission for transmitting power from a power source to the reel of a film box.

A still further object of the present invention is to provide a compact mounting and drive for a disk shutter.

A yet further object of the present invention is to provide a method for repetitively registering masks and other images with a film strip.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 7 illustrates a pivotable pressure plate;

FIG. 8 is an isometric exploded view of the film boxes;

FIG. 9 is a partial cross sectional view taken along lines 9—9, as shown in FIG. 8;

FIG. 10 is a partial cross-sectional view illustrating the film drive mechanism for the film reel;

FIG. 11 is a further view of the film drive mechanism;

FIGS 18a and 18b illustrate the superimposition of multiple elements for multiple exposures of a single frame of film; and FIGS. 19a and 19b illustrate use and disengagement of the film registration elements.

DESCRIPTION OF THE PREFERRED EMBODIMENT

Figure 1:
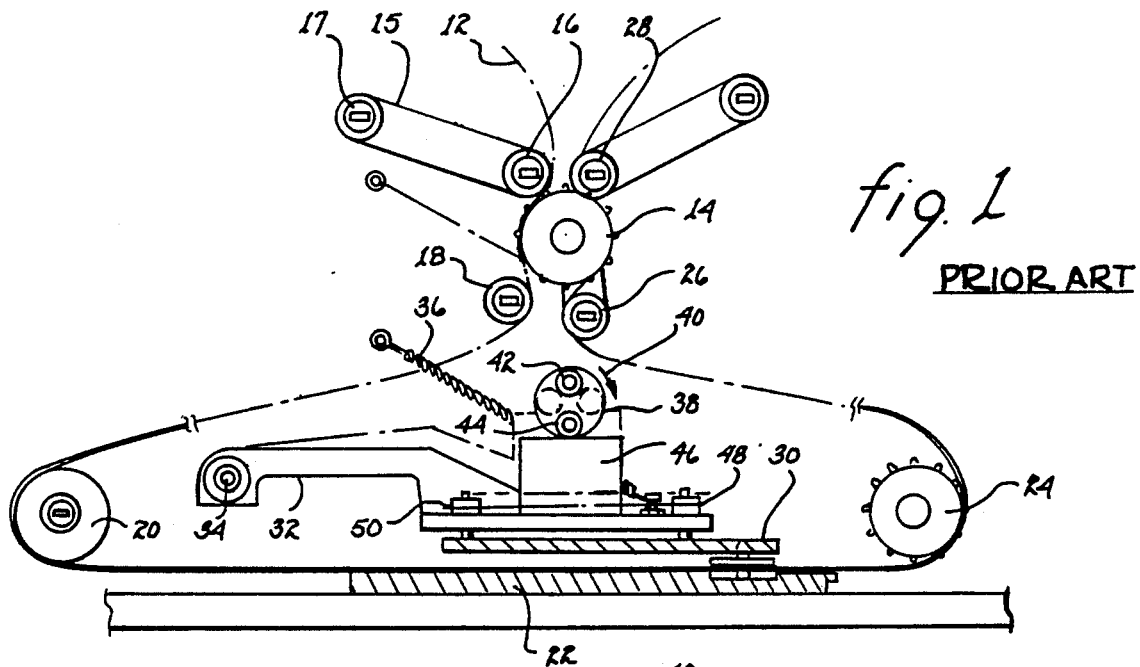
FIG. 1 is a partial side view of the film transport mechanism of a prior art camera.

Referring to FIG. 1, there is illustrated a film transport mechanism 10 of prior art high quality cameras. Unexposed film strip 12, which may be 35 mm film, is brought into engagement with a drive sprocket 14 and retained in place by pivotally mounted roller 16 (attached to arm 15 extending from pivot pin 17) and fixed roller 18; in certain embodiments, roller 18 may be repositionable to facilitate engagement and/or disengagement of film strip 12 with sprocket 14. A roller 20, which may also be a freely rotatable sprocket, supports film strip 12 and aligns it with a base plate 22. The base plate includes an aperture (not shown) through which light is transmittable in response to operation of a shutter to expose the segment of the film strip in correspondence with the aperture. A further roller or sprocket 24 directs the film strip from the base plate to roller 26, which roller guides the film strip onto sprocket 14. Roller 28, which may be pivotally mounted (on arm 27 and pivot pin 29) guides the film strip from sprocket 14 to a take up reel (not shown).

For cameras of the type shown in FIG. 1, a pressure plate 30 is vertically translatable to bring about engagement and permit disengagement of an underlying segment of film strip 12 with registration pins extending upwardly from the base plate. These registration pins are aligned with the conventional sprocket holes found in film strips. The pressure plate is supported by an arm 32 pivotally secured to a shaft 34. Upward movement of the pressure plate is urged by a coil spring 36 or the like. A cam 38, rotatable as indicated by arrow 40 includes a pair of opposed rollers 42, 44 in rolling engagement with the top surface of an anvil 46. Upon rotation of cam 38, rollers 42, 44 will engage anvil 46 to bring about repetitive vertical displacement of the anvil and the attached pressure plate (as illustrated by dashed line 47). The cam and sprocket 14 are synchronized to obtain disengagement of pressure plate 30 with the underlying strip of film upon rotation of sprocket 14 to advance the film. Similarly, sprocket 14 is stationary commensurate with downward movement of the pressure plate to permit momentary registration of the film with the registration pins. The pressure plate may be spring mounted, as represented by bushings 48, 50.

While cameras of the type described above are capable of functioning adequately from a photographic standpoint, certain deficiencies or manipulative difficulties exist. These include the requirement for manually lifting the film strip off the registration pins to advance the film strip. In one type of prior art camera, a gate is employed to assist in lifting the film off the registration pins but the film must be initially threaded through such gate; sometimes, operators forget to so thread the film strip. Shrinkage of the film strip is an industry wide problem and for precise alignment of superimposed images, such shrinkage may be of significant importance; the conventional registration pins used do not accommodate for such shrinkage while maintaining multiple exposures aligned with one another. Further, the type of loop film transport arrangement illustrated in FIG. 1 may be compromised as a result of film shrinkage.

Figure 2:
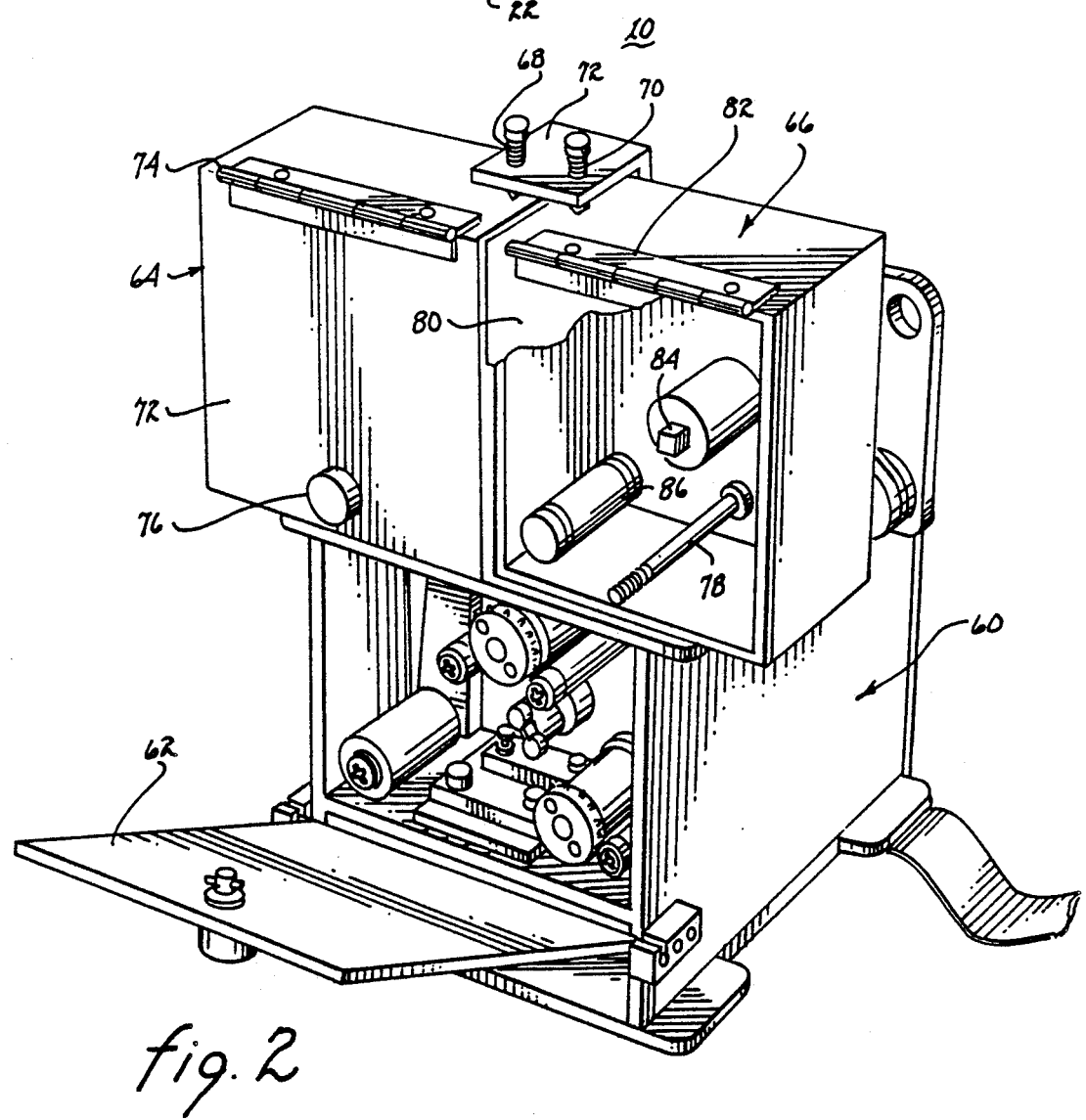
FIG. 2 is an isometric view of a film transport mechanism incorporating the present invention.

Referring to FIG. 2, there is shown a compartment 60 for housing the film transport mechanism of the present invention. The compartment includes a latchable door 62 for providing access to the film transport mechanism as well as access to the film being transported and to any masks which are to be added or removed. The door is made light tight upon closure by conventional well known means. A feed reel of unexposed film is contained within a film box 64. Similarly, film box 66 includes a film reel for taking up the exposed film. Each of the film boxes is removably positioned with respect to compartment 60 by means of interconnecting and position locating pins. Engagement with the pins is maintained by retaining bolts 68, 70 extending from and in threaded engagement with bracket 72. Upon downward rotational movement of the bolts, the respective film box is maintained in positional engagement with the pins or other keying mechanisms intermediate the respective film box and compartment 60. Film box 64 includes a door 72 secured thereto via a hinge 74. A threaded knob 76 is engaged with a stud 78 (see film box 66) to retain the door in place. Film box 66 includes a similar door 80, hinge 82 and knob. Each film box includes a shaft 84 for receiving and retaining a film reel. A roller 86 serves as a guide for the film between a mounted film reel and a light tight slot (not shown) in the bottom of the film box. This slot cooperates with an aligned slot in the top of compartment 60 to provide passage for the respective lengths of film into or out of the compartment and the respective film box.

Figure 3:
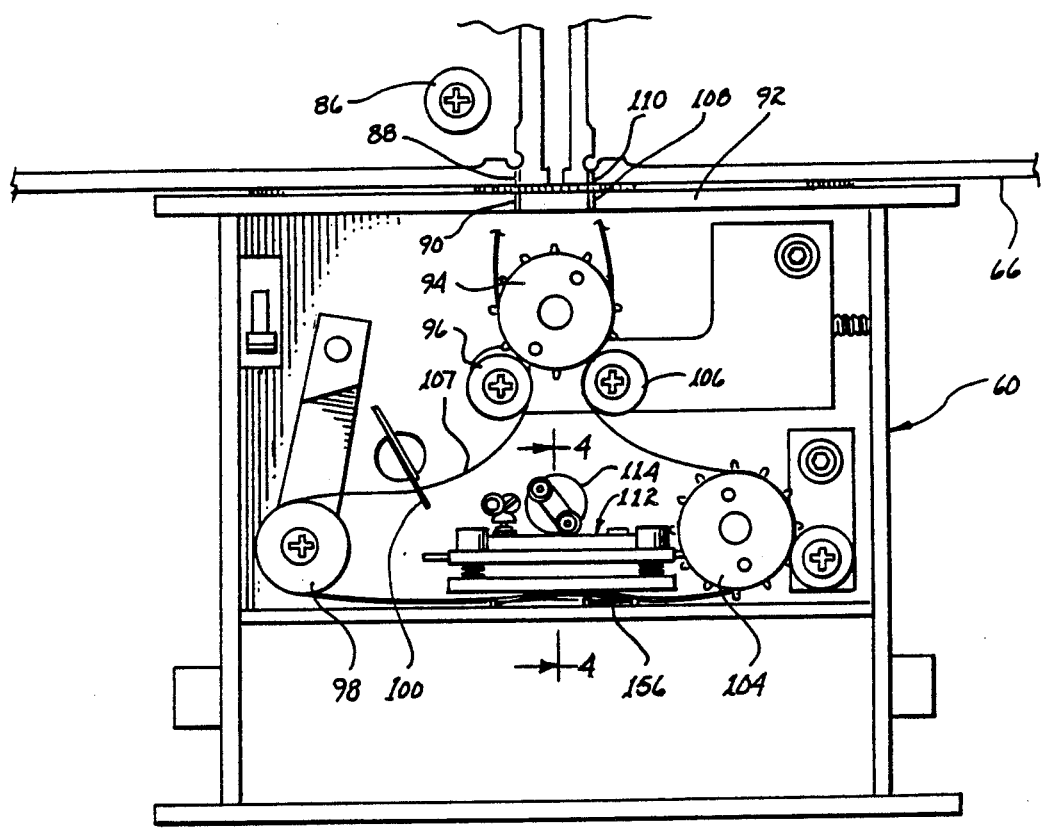
FIG. 3 is a front elevational view of the film transport mechanism of the present invention and FIG. 3a illustrates a detail thereof.
Figure 17:
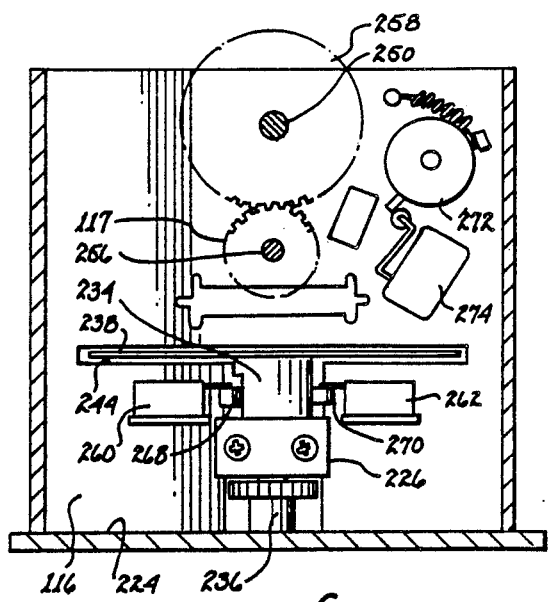
FIG. 17 is a cross sectional view taken along lines 17—17, as shown in FIG. 14.

Referring jointly to FIGS. 2 and 3, the film transport mechanism within compartment 60 will be described in greater detail. Film from a film feed reel within film box 64 is threaded through a slot 88 in the film box and a corresponding slot 90 in wall 92 of compartment 60. These slots are made light tight by conventional well known means. The film engages a drive sprocket 94 (mounted on shaft 256 and driven by gear 258, see FIG. 17) and then passes partially about a roller 96 to a pivotally mounted roller 98 to provide tension to the film strip. Roller 98 is mounted on arm extending from boss 272 and positionally sensed by miniature switch 274, as shown in FIG. 17. A film cutting device 100 may be disposed to act upon the strip of film 102 intermediate rollers 96 and 98. From roller 98, the strip of film passes to sprocket 104. Roller 106 guides the film onto sprocket 94. From the sprocket, the film passes through slot 108 in top wall 92 and corresponding slot 110 in film box 66 to the take up reel within the film box.

Figure 3A:
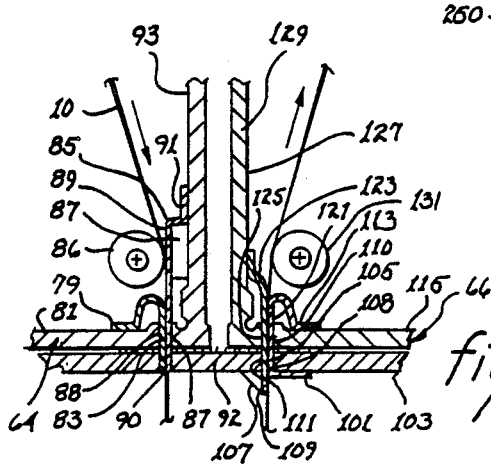

Referring to FIG. 3A, there is shown apparatus for ensuring lack of light penetration through slot 88 of film box 64 and slot 110 of film box 66. A length of material 79, such as felt, is adhered to interior surface 81 of film box 64 proximate slot 88. The material is looped upwardly, as illustrated, and into slot 88. Within the slot, the material is adhered to slot wall 83. A second length of material 85, such as felt, is adhered to opposing slot wall 87 and extends upwardly adjacent to front surface 89 and top surface 91 of a guide 89 extending from vertical wall 93 of film box 64; the material may be adhered to these surfaces. Therefrom, material 85 extends upwardly in adhering relationship to a part of wall 93.

Guide 89, with the downwardly extending covering of material, in conjunction with roller 86, directs the end of a film strip 102 therebetween and into slot 88. Without such direction, penetrable insertion of the end of the film strip through slot 88 and adjacent aligned slot 90, would be relatively more difficult and require more attention by an operator. The opposing surfaces of material 79 and 85 within slot 88 compressively engage one another to preclude transmission of light from a point exterior of film box 84. The opposing materials also provide a benefit of wiping the strip of film passing therethrough. Because, under normal circumstances, no film strip would be within the camera when film box 64 is removed, it is unnecessary to prevent transmission of light through slot 90. However, pads of material, such as felt, may be secured therewithin to preclude such light transmission.

Still referring to FIG. 3A, there is illustrated an embodiment of materials for precluding light exposure of a film strip upon withdrawal from the camera and insertion into film box 66. A length of material 101, such as felt, is adhered to interior surface 103 of wall 92 adjacent slot 108 and extends into the slot for adhering contact with slot wall 105. A support 107 depends from wall 92 adjacent slot 108. A length of material 109, such as felt, is adhered to a vertical wall of support 107 and extends into slot 108 in adhering relationship to slot wall 111. Support 107, in combination with wall 92, will serve in the manner of a guide to direct the end of a film strip intermediate slot 108 intermediate the opposing materials. A length of material 113, such as felt, is adhered to surface 115 of film box 66. The material is looped upwardly therefrom and downwardly into slot 110. The penetrating portion of material 113 is adhered to slot wall 121. A further length of material 123, such as felt, is adhered to slot wall 125 and extends upwardly therefrom into adhering contact with surface 127 of upright wall 129 of film box 66. The film box may include a roller 131 to guide the film strip from slot 110 onto the take up reel. The opposed lengths of material within slot 108 and within slot 110 preclude transmission of light therethrough and maintain the interior of the camera and the interior of the film box light tight.

Figure 13:
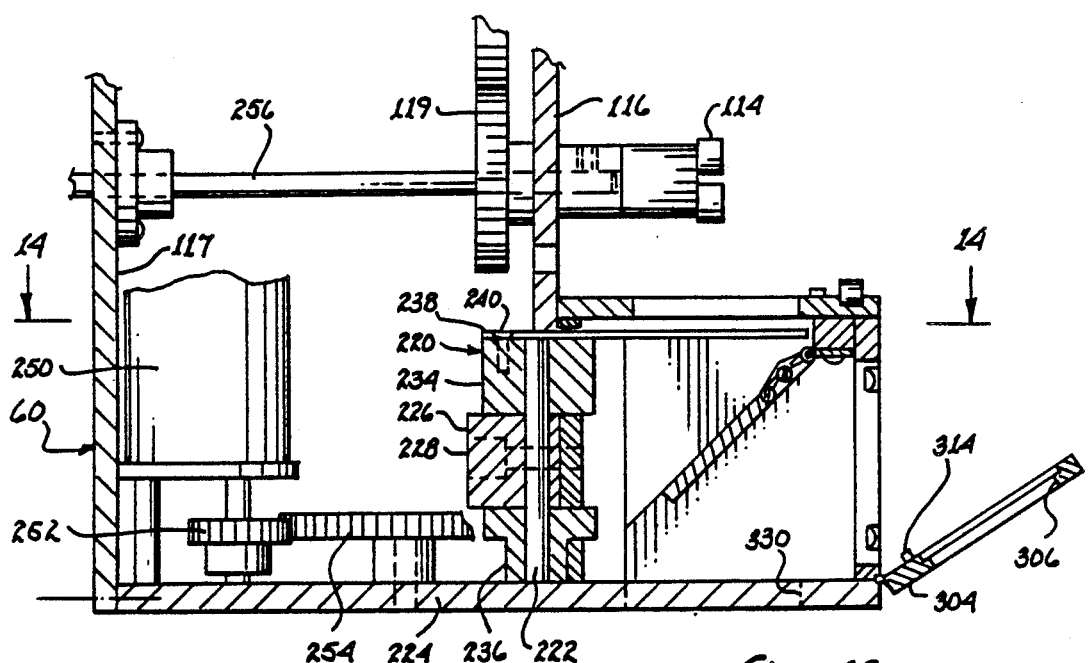
FIG. 13 is a partial cross sectional view taken along lines 13—13, as shown in FIG. 12.
Figure 16:
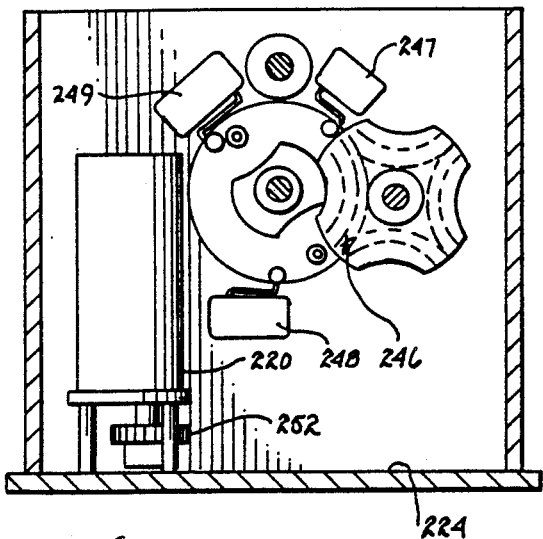
FIG. 16 is a cross sectional view taken along lines 16—16, as shown in FIG. 14.

Referring jointly to FIGS. 2, 3, 4 and 5, pressure plate assembly 112 will be described in further detail. A cam 114 extends from back wall 116 of compartment 60 and is mounted to permit rotation in response to drive means; note shaft 256 journaled in back wall 116 and rear wall 117 and rotatable through a gear 117, as shown in FIG. 13. A Geneva mechanism 246, shown in FIG. 16, may be used to rotate shaft 256 and cam 114. A plurality of miniature switches 247, 248 and 249 may be used to generate timing signals and position indicators. Cam 114 cooperates with an anvil 118 to bring about vertical displacement of the anvil in correspondence with rotation of the cam. The anvil is secured to a mounting plate 120, which mounting plate is pivotally secured to back wall 116 by pivot means 122. A pressure plate 124 depends from mounting plate 20 via studs 126. A coil spring 128 is disposed about each stud and intermediate the pressure plate and the mounting plate to bias the pressure plate downwardly from the mounting plate and yet accommodate upward movement of the pressure plate by sliding movement of the shafts through the mounting plate. A head 130 associated with each stud limits downward displacement of the stud in response to urging of coil spring 128. The pressure plate cooperates with aperture plate assembly 132, as described below.

A plurality of channels 134 extend transversely across the pressure plate in alignment with the direction of travel of a strip of film disposed therebeneath. These channels permit disbursal of air intermediate the strip of film and the pressure plate, which air might otherwise serve in the manner of a cushion and preclude full downward travel of the pressure plate. It has been learned that the use of channels provides substantially better results in dissipating air than the use of holes in the pressure plate for this purpose.

Registration of the film strip with the aperture plate assembly is assured through the use of three registration pins 140, 142, 144. Apertures 146, 148, 150 within pressure plate 124 positionally correspond with the registration pins to permit penetration thereinto of the registration pins. Aperture 152 within aperture plate assembly 132 defines the size of the picture frame and corresponding segment of film to be exposed, assuming that a mask or the like is not employed. Since registration of the film is of critical importance only with respect to the area defined by aperture 152, pins 140, 142 and 144 are located laterally adjacent the aperture and in alignment with sprocket holes 154 in film strip 102. The standard size of sprocket holes 154 is 0.110 inches in length by 0.0078 inches in width. To align the film strip in the direction of travel, it is important to ensure that there is not even slight angular misalignment. Such alignment is achieved by registration pins 140 and 142. Each of these pins are exactly 0.110 inches long (transverse to the direction of the travel of the film strip) to ensure an exact fit with two opposed edges of sprocket holes 154. To assist in penetrable engagement of each registration pin with the respective sprocket hole, the registration pins may have their top surface sloped or beveled along an axis transverse to the direction of travel of the film strip to facilitate penetration with a sprocket hole. Since the critical positioning accomplished by registration pins 140 and 142 is that of positioning the film strip laterally (transverse to the direction of travel of the filmstrip), the width of the registration pins may be less than 0.078 inches to facilitate penetrable engagement. Further, by reducing the width of registration pins 140, 142 to less than 0.078 inches, movement of the film strip longitudinally to obtain exact alignment in that axis may be accommodated. The purpose of registration pin 144 is that of positioning film strip 102 longitudinally (in the direction of travel). To achieve this result, the width of registration pin 144 is exactly 0.078 inches. The length of this registration pin is preferably less than 0.110 inches in order that this registration pin not impede or otherwise conflict with the positioning of the film strip laterally as provided by registration pins 140 and 142. By use of these two sets of registration pins wherein one set positions the film strip in one axis only and the other set positions the film strip only in the other axis, very precise positioning of the film strip may be accomplished. Such exactness in positioning is of great importance in order to achieve exact and precise positioning of any masks or overlays used in conjunction with the formation of an image upon the film strip.

To assist in disengaging the film strip from registration pins 140, 142 and 144 during transport of the film, a leaf spring 156 is employed beneath the edge of the film strip (see FIG. 3).

Figure 4:
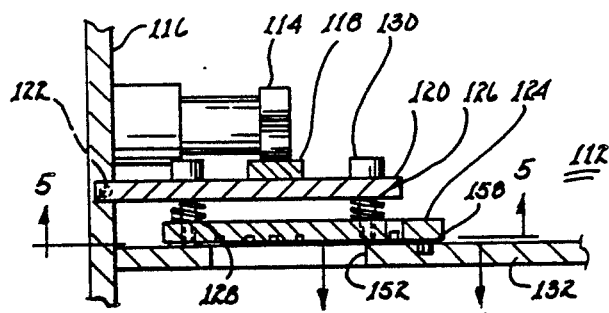
FIG. 4 is a partial cross sectional view taken along lines 4—4, as shown in FIG. 3.
Figure 6:
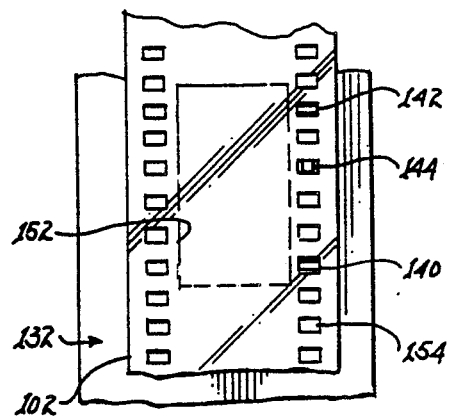
FIG. 6 is a partial view taken along lines 6—6, as shown in FIG. 4.
Figure 5:
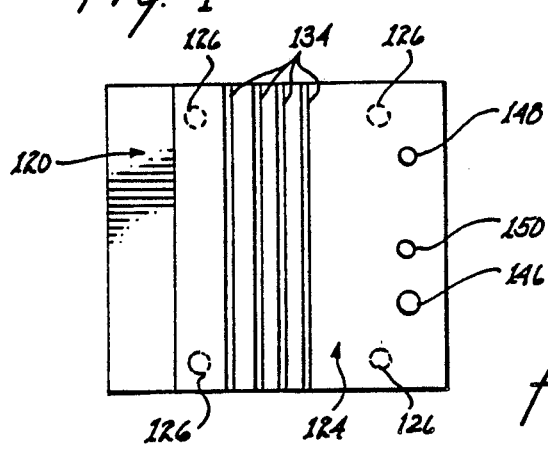
FIG. 5 is a partial view taken along lines 5-5 as shown in FIG. 4.

This leaf spring may be mounted in channel 158 of aperture plate assembly 132 (as illustrated in FIG. 4). The leaf spring is curved to provide an upwardly acting bias upon the edge of the film strip lateral of the sprocket holes formed therein. By using channel 158, the leaf spring is forced thereinto upon the lowering of pressure plate 124 and the leaf spring will not interfere with the registration or other positioning of the film strip. Yet, upon the raising of the pressure plate, the leaf spring will bend and lift the edge of the film strip off it's registration pins.

Referring to FIG. 7, there is illustrated pivot means 122 of pressure plate assembly 112. Mounting plate 120 is pivotally secured to rear wall 116 by means of at least a pair of pins 159 disposed in horizontal slots 160 formed in wall 116. Such engagement permits pivotal movement of the pressure plate assembly. To retain pins 159 in their respective slots, a coil spring 162 or the like interconnects wall 116 with an attachment point, such as bolt 164 extending from mounting plate 120. The coil spring urges retention of pins 159 in their respective slots and yet permits upward and downward pivotal movement of the pressure plate assembly. Furthermore, coil spring 168 tends to bias anvil 118 against cam 114 to ensure movement of the pressure plate assembly in response to rotation of the cam.

Referring jointly to FIGS. 8, 9, 10 and 11, certain features attendant film boxes 64 and 66 will be described in further detail. Registration of the film boxes upon top wall 92 of compartment 60 may be effected by pins 170, 172 extending upwardly therefrom. These pins penetrably engage correspondingly located cavities 174 in the bottom of the respective film box; note cavity 174 illustrated in FIG. 9. Thus, film transport between compartment 60 and each of the film boxes through the respective slots (such as slot 108) is assured and repetitively achievable. Retention of the film box in its proper and precisely located location is assured by bolt 70 penetrably engaging a precisely located depression 178 in top 180 of each film box, as illustrated in FIG. 9.

The drive mechanism for the film reels in each of the film boxes will be described with particular reference to FIGS. 8, 10 and 11. Reel drive shaft 84 includes an extension 182 journaled within a bearing support 184 attached by a bolt 188 to rear wall 186 of a film box, such as film box 66. A collar 190 is secured to shaft extension 182 by a pin 192. The collar includes a pair of diametrically opposed studs 194, 196 extending axially therefrom. A drive motor 200 is mounted to support 202 extending from compartment 60 to rotatably drive a pulley 204. This pulley is interconnected with a belt 208 to a rotatably mounted pulley 206 extending form support 202. A pair of diametrically located studs 210, 212 extend axially from pulley 206. Upon placing film box 66 upon the top of compartment 60 and securing the film box in place with bolt 70, collar 190 will be axially aligned with pulley 206. Furthermore, the studs of pulley 190 will be in an overlapping relationship with the studs of pulley 206, as illustrated in FIG. 10. Upon rotation of pulley 206, commensurate rotation of collar 190 will occur through the interfering contact between the overlapped pair of studs. It may be noted that this drive train for shaft 84 does not require exact and precise alignment between pulley 206 and pulley 190. Furthermore, the belt drive will accommodate interruption of rotation of shaft 84 without resulting destructive effect upon any components; instead, belt 208 will simply slip upon one or both of the pulleys. The degree and extent of slippage is, of course, a function of the amount of tension under which belt 208 is mounted. More subtly, with this drive mechanism for the take up reel, a commensurate mechanism may be employed to unwind the film from the film feed reel. Any lack of synchronization between the film transport mechanisms within compartment 60 and the film reels is readily accommodated without any expected damage to the components or the film strip.

Figure 12:
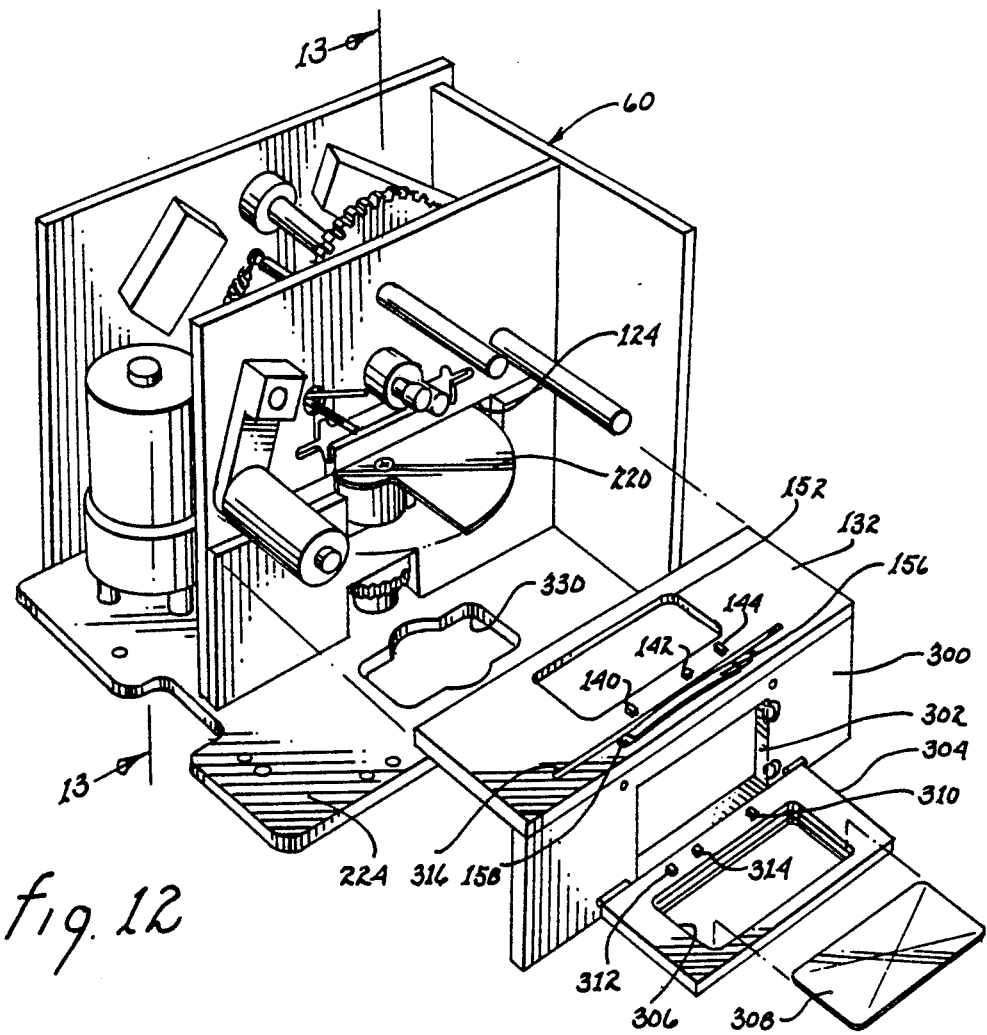
FIG. 12 is an isometric exploded view of the shutter mechanism.
Figure 15:
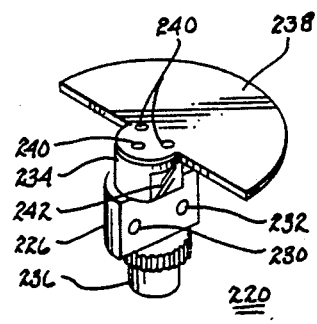
FIG. 15 illustrates the components of the shutter.

One of the main problems in any camera of the type illustrated and disclosed herein relates to the size of the shutter mechanism. That is, usually a rotatable shutter is employed which defines a segment of a disk. Such disk must be accurately mounted to ensure precise and predeterminable exposure of the film for a set fraction of a second. Secondly, the shutter is preferably of very light weight to reduce its moment of inertia and assist in starting and stopping the shutter. Referring jointly to FIGS. 12, 13 and 15 there is illustrated apparatus related to the shutter and its operation. Shutter 220 is mounted within compartment 60 against sidewall 222 extending upwardly from base 224 by journal 226 and is secured thereto by a pair of bolts 228 penetrably engaging apertures 230, 232 in the journal and threaded apertures in the sidewall. A shaft rotatably mounted in journal 226 extends from opposed ends thereof to non rotatably engage each of boss 234 and gear 236. A disc segment 238, illustrated as semi-circular, is secured to the upper surface of boss 234 by a plurality of bolts 240 and extends through slot 244 in back wall 116. This disk segment extends beneath aperture 152 in aperture plate assembly 132 and serves as a shutter to regulate the light impinging upon the film strip mounted upon the aperture plate assembly. The drive mechanism for shutter 220 includes a drive motor 250 having an output gear 252. The output gear engages gear 236 of the shutter via a further gear 254.

Figure 14:
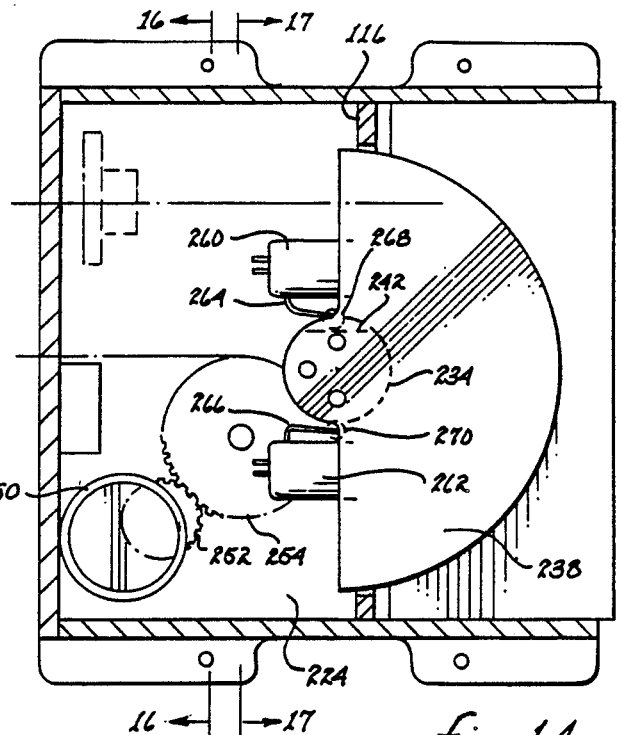
FIG. 14 is a cross sectional view taken along lines 14—14, as shown in FIG. 13.

Boss 234 includes a flat 242, which flat serves as a keying element corresponding with the position of disc segment 238. As illustrated in FIG. 14, a pair of miniature switches 260, 262 include pivotable arms 264, 266 having rollers 268, 270 disposed at the ends thereof for making rolling contact with boss 234. Upon displacement of one of the rollers, in conformance with rolling motion across flat 242, the corresponding switch changes state from a normally closed to normally open or vice versa, depending upon the electrical signal to be passed or interrupted by the miniature switch.

From the above description, it will be appreciated that the support and drive mechanism for shutter 220 is very compact, which compactness permits a relatively small sized shutter compartment or space. The compactness is achieved by mounting the pivot axis close to the edge of the film strip to minimize the diameter of the shutter. This close mounting is achieved by having a flat in journal 226 adjacent the axis of rotation of the shutter, which flat permits reduction of the distance between the film edge and the axis of rotation of the shutter. The shutter supporting shaft 222 is journaled in journal 226 which is of sufficiently robust construction to withstand the forces imposed upon it. The drive mechanism for rotating the shutter is a gear 236 located at the side of journal 226 opposite to the shutter to aid in balancing the loads imposed upon shaft 222; moreover, the shape and location of journal 226 minimizes the space required for shutter 238 and its supporting shaft.

Referring to FIG. 12, further details attendant transport of the film strip and superimposition of a mask or other overlay will be described. Aperture plate assembly 132 may include a sidewall 300 extending downwardly therefrom. This sidewall includes a window 302 through which an image is to be transmitted. A door 304, having an aperture 306, is pivotally attached to sidewall 300 to permit juxtapositioning of aperture 306 with window 302. Aperture 306 is configured to nestingly receive a section of frosted glass 308. A plurality of registration pins 310, 312, 314 extend from the door to receivingly engage the sprocket holes of a mask, grid overlay or the like to be placed adjacent the door. Registration pins 310, 312 and 314 correspond in size and function with registration pins 140, 144 and 142, respectively. Accordingly, the positioning accuracy and registrability of an overlay placed adjacent door 304 will have the same accuracy as a film strip placed upon the aperture plate assembly.

It may be noted that spring 156 and channel 158 within which the spring lies are clearly illustrated in FIG. 12. Furthermore, there is illustrated in FIG. 12 a channel 316, which channel serves the function of accommodating an air flow under the corresponding edge of a film strip placed upon the aperture plate assembly during raising of the film strip under force of spring 156 or lowering of the film strip in response to downward movement of the pressure plate.

A lens (not shown) is secured to base 224, shown in FIG. 12, to project an image through aperture 330 in the base. The projected image corresponds with aperture 152 of the aperture plate assembly. To permit viewing of the image to be recorded on film, a pivotally mounted mirror is secured to a mounting block 334 attached to aperture plate assembly 132 by bolts 336. This mirror reflects the image from the subject being photographed onto frosted glass 308 in door 304 when the door is closed. In the event an overlay having a mask, grid, etc. formed therein is placed upon the registration pins of the door, the projected image reflected by mirror 332 will be superimposed upon such mask, grid, etc. to permit a photographer to confirm the accuracy and correctness of the image to be photographed. During exposure of a film strip placed upon the aperture plate assembly, mirror 332 is pivotally relocated downwardly to prevent interference with the image transmitted through aperture 330 in base 224, through aperture 152 in the aperture plate assembly and onto the film strip. Such repositioning of the mirror may be accomplished by conventional mechanical means in response to sensing signals developed by the miniature switches attendant bushing 234 of shutter 220. Other sensing and operative mechanisms may also be employed.

Referring to FIGS. 19a and 19b, further details of the function and operation of registration pins 140, 142 and 144 will be described in conjunction with the use of a mask or grid to be superimposed upon a section of film strip to be exposed. Pin 140, extending upwardly from aperture plate assembly 132, in combination with pin 142 (see FIG. 12) penetrably engages the sprocket holes of both the mask and film strip to be used and locates such mask and film strip in accurate repeatable longitudinal alignment. Registration pin 144, accurately and repeatably locates the mask and the film strip in lateral alignment. A mask or grid 340 is placed upon aperture plate assembly 132 in penetrable engagement with the registration pins to extend across aperture 152 (see FIGS. 12 and 13). Edge 342 of this mask has been cut down from conventional size to preclude extension of the mask over channel 158 wherein leaf spring 156 is lodged. Film strip 102 is brought into penetrable engagement with the registration pins upon downward movement of pressure plate 124. Lateral edge 344 of filmstrip 102 will extend over channel 158 and into overlapping arrangement with leaf spring 156. Upon release of pressure plate 124 with resulting upward relocation thereof, leaf spring 156 will bow upwardly. Such bowing will exert an upward force upon film strip 102 proximate edge 344. The resulting upward movement of the film strip will disengage sprocket holes 154 from the underlying registration pins. Moreover, the leaf spring will maintain the film strip raised above the registration pins which permits translation of the film strip by actuation of appropriate sprockets of the camera. However, end 342 of mask 340 is positioned out of contact with leaf spring 156 and the bowing of the leaf spring will not come into contact with the mask. Accordingly, the mask will remain in penetrable engagement with the registration pins. To remove or replace the mask, one must physically lift the mask off the registration pins and reinstall a replacement mask or grid.

Referring to FIG. 18a, there is illustrated the use of a first mask 350 for placement upon aperture plate assembly 132 to mask all but a central portion 352. A film segment 354 placed over mask 350 and exposed will have formed therein an image 356 corresponding in size to portion 352 of the mask. Subsequent placement of a mask 358 having a masked central portion 360, corresponding in size to portion 352 is placed upon the aperture plate assembly. Film strip 354, subsequently placed upon mask 358 and exposed, will result in a composite image 362 formed therein and depicting the subject matter not masked by mask 350 and not masked by mask 356 and without overlap of the two images. Such lack of overlap and essentially perfect registration between the two images is repeatably possible by the use of registration pins 140, 142 and 144. As discussed earlier, prior to exposure of the film strip, the image presented with each mask may be viewed upon frosted glass 308. Thus, conformance of the intermediate images to that desired, as well as the composite image can be checked and verified before exposure of film 354.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirement without departing from those principles.

I claim:

1. A removable film box usable with a camera for housing either a film feed reel or a film take up reel, said film box comprising in combination:
   a) an armature for supporting a reel within said film box;
   b) a hatch for opening said film box to insert and remove a film reel;
   c) a light tight slit for accommodating transport of the film exterior of said film box;
   d) position keying elements cooperating with complementary elements of the camera for repetitively accurately locating said film box relative to the camera, including means for retaining said position reying elements engaged with the complementary elements; and
   e) drive means for rotating said armature, said drive means including a shaft extension extending from said armature externally of said film box, a source of power, an axially disengageable transmission disposed intermediate said shaft extension and said source of power for transmitting power to rotate said shaft extension.

2. The removable film box as set forth in claim 1 wherein said transmission comprises a collar, a first pair of diametrically opposed studs extending axially from said collar, a pulley, a second pair of diametrically opposed studs extending axially from said pulley, said second pair of studs engaging and rotating said first pair of studs about the axis of rotation of said collar in response to energization of said power source.

3. The removable film box as set forth in claim 1 wherein said retaining means comprises a thumb screw.

4. The removable film box as set forth in claim 1 including means associated with said film box for journaling and supporting said shaft extension.

5. The removable film box as set forth in claim 1 wherein said transmission includes first stud means rotatable about the axis of rotation of said shaft extension and second stud means actuated by said power source for engaging and rotating said first stud means.

6. The removable film box as set forth in claim 5 wherein said first stud means includes at least one stud laterally displaced from and axially aligned with the axis of rotation of said shaft extension.

7. The removable film box as set forth in claim 6 wherein said second stud means comprises at least another stud laterally displaced from and axially aligned with the axis of rotation of said shaft extension and radially located equivalent to said first stud means for interfering with said first stud means and urging rotation of said first stud means about the axis of rotation of said shaft extension.

* * * * *